(12) United States Patent
Kamm et al.

(10) Patent No.: US 7,621,840 B2
(45) Date of Patent: Nov. 24, 2009

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 11/717,538

(22) Filed: Mar. 13, 2007

(65) Prior Publication Data

US 2007/0232437 A1 Oct. 4, 2007

(30) Foreign Application Priority Data

Mar. 30, 2006 (DE) .................. 10 2006 014 753

(51) Int. Cl.
*F16H 3/62* (2006.01)
(52) U.S. Cl. ...................................... 475/275
(58) Field of Classification Search .................. 475/275
See application file for complete search history.

(56) References Cited

U.S. PATENT DOCUMENTS

| 4,038,888 | A | * | 8/1977 | Murakami et al. | ........... 475/276 |
| 6,176,803 | B1 | | 1/2001 | Meyer et al. | |
| 6,634,980 | B1 | | 10/2003 | Ziemer | |
| 6,960,149 | B2 | | 11/2005 | Ziemer | |
| 7,014,589 | B2 | | 3/2006 | Stevenson | |
| 7,018,319 | B2 | | 3/2006 | Ziemer | |
| 7,204,780 | B2 | * | 4/2007 | Klemen | ........... 475/279 |
| 7,285,069 | B2 | * | 10/2007 | Klemen | ........... 475/275 |
| 7,311,635 | B2 | * | 12/2007 | Klemen | ........... 475/286 |

FOREIGN PATENT DOCUMENTS

| DE | 42 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 010 210 A1 | 9/2006 |

* cited by examiner

*Primary Examiner*—Ha D. Ho
(74) *Attorney, Agent, or Firm*—Davis & Bujold, P.L.L.C.

(57) ABSTRACT

An eight-gear transmission comprises an input and output shaft, four planetary gearsets, eight shafts and five shifting elements. A ring gear of the gearset (RS4) and the input shaft are coupled as the first shaft. A ring gear of the gearset (RS2), a carrier of the gearset (RS3), and the output shaft are coupled as the second shaft. A sun gear of the gearset (RS1) and a sun gear of the gearset (RS4) are coupled as the third shaft. A ring gear of the gearset (RS1) forms the fourth shaft. A sun gear of the gearset (RS3) forms the fifth shaft. A carrier of the gearset (RS1) and a ring gear of the gearset (RS3) are coupled as the sixth shaft. A sun gear of the gearset (RS2) and a carrier of the gearset (RS4) are coupled as the seventh shaft. A carrier of the gearset (RS2) forms the eighth shaft.

32 Claims, 5 Drawing Sheets

Fig. 1

| Gear | Engaged Shifting Elements ||||| Ratio i | Step φ |
|---|---|---|---|---|---|---|---|
| | Brake || Clutch ||| | |
| | A | B | C | D | E | | |
| 1 | ● | ● | ● | | | 4.40 | |
| 2 | ● | ● | | | ● | 3.21 | 1.37 |
| 3 | | ● | ● | | ● | 2.23 | 1.44 |
| 4 | | ● | | ● | ● | 1.68 | 1.33 |
| 5 | | ● | ● | ● | | 1.30 | 1.29 |
| 6 | | | ● | ● | ● | 1.00 | 1.30 |
| 7 | ● | | ● | ● | | 0.87 | 1.16 |
| 8 | ● | | | ● | ● | 0.73 | 1.19 |
| R | ● | ● | | ● | | -2.70 | TOTAL 6.03 |

MULTI-SPEED TRANSMISSION

This application claims priority from German Application Serial No. 10 2006 014 753.7 filed Mar. 30, 2006.

FIELD OF THE INVENTION

The invention relates to a multi-speed transmission in a planetary design, in particular an automatic transmission for a motor vehicle. The transmission comprises one input shaft and one output shaft, four planetary gearsets, at least eight rotatable shafts, and five shifting elements, whose selective locking determines different gear ratios between the input and output shaft, so that eight forward gears and at least one reverse gear can be implemented.

BACKGROUND OF THE INVENTION

In the state of the art, automatic transmissions, particularly for motor vehicles, comprise planetary gearsets that are switched by way of friction or shifting elements, such as clutches and brakes, and are usually connected with a starting element that is subject to slip-effect and is optionally provided with a lock-up clutch, such as a hydrodynamic torque converter or a fluid clutch.

The Applicant's DE 101 15 983 A1, for example, discloses a multi-speed transmission with an input shaft that is connected to a front-mounted gearset, with an output shaft that is connected to a rear-mounted gearset with a maximum of seven shifting elements, which can be selectively switched to produce at least seven forward gears without range shifting. The front-mounted gearset consists of a shiftable or non-shiftable planetary gearset, or a maximum of two non-shiftable, coupled planetary gearsets. The rear-mounted gearset is configured as a two-carrier, four-shaft transmission with two shiftable planetary gearsets, and has four free shafts. The first free shaft of this two-carrier, four-shaft transmission is connected to the first shifting element, the second free shaft with the second and third shifting elements, the third free shaft with the fourth and fifth shifting elements, and the fourth free shaft is connected to the output shaft. For a multi-speed transmission with a total of six shifting elements, the invention proposes to additionally connect the third free shaft or the first free shaft of the rear-mounted transmission to a sixth shifting element. For a multi-speed transmission with a total of seven shifting elements, the invention proposes to additionally connect the third free shaft with a sixth shifting element, and to additionally connect the first free shaft with a seventh shifting element.

Several other multi-speed transmissions are known, for example from the Applicant's DE 101 15 995 A1, which discloses four shiftable, coupled planetary gearsets and six or seven friction-locking shifting elements, whose selective engagement transfers a rotational drive of an input shaft of the transmission to an output shaft of the transmission in such a way that nine or eleven forward gears and at least one reverse gear can be implemented. Depending on the gear arrangement, in each gear two or three shifting elements are engaged, and when switching from one gear into the next higher gear or the next lower gear, only one engaged shifting element is disengaged or one shifting element that previously disengaged is engaged, in order to avoid range shifting.

In addition, the applicant's non-published generic patent application DE 10 2005 002 337.1 discloses a multi-speed transmission with an input shaft, an output shaft, four coupled single planetary gearsets and five shifting elements, by way of which eight forward gears can be shifted without range shifting in such a way that when switching from one forward gear into the respective next following higher or lower forward gear, only one of the previously engaged shifting elements is opened, and only one of the previously disengaged switching elements is engaged. The multi-speed transmission also has a reverse gear. In each of the forward gears, and in the reverse gear, three shifting elements are engaged. With respect to the kinematic coupling of the four planetary gearsets with each other and with the input and output shafts, a carrier of the fourth planetary gearset and the input shaft are connected, forming a first shaft of the transmission; a carrier of the third planetary gearset and the output shaft are connected, forming a second shaft of the transmission; a sun gear of the first planetary gearset and a sun gear of the fourth planetary gearset are connected, forming a third shaft of the transmission; a ring gear of the first planetary gearset forms a fourth shaft of the transmission; a ring gear of the second planetary gearset and a sun gear of the third planetary gearset are connected, forming a fifth shaft of the transmission; a carrier of the first planetary gearset and a ring gear of the third planetary gearset are connected, forming a sixth shaft of the transmission; a sun gear of the second planetary gearset and a ring gear of the fourth planetary gearset are connected, forming a seventh shaft of the transmission; and a carrier of the second planetary gearset forms an eighth shaft of the transmission. With respect to the kinematic coupling of the five shifting elements to the four planetary gearsets, and to the input and output shafts, the first shifting element is arranged in the direction of power flow between the third shaft and a housing of the transmission, the second shifting element between the fourth shaft and the transmission housing, the third shifting element between the first and fifth shafts, the fourth shifting element either between the eighth and second shafts or between the eighth and sixth shafts, and the fifth shifting element either between the seventh and fifth shafts or between the seventh and eighth shafts, or between the fifth and eighth shafts.

As a general concept, automatically shiftable motor vehicle transmissions in planetary design have been described many times before in the art and are subject to constant further development and improvement. Transmissions of this kind should therefore disclose a sufficient number of forward gears and one reverse gear, and should have a high transmission-ratio spread and favorable progressive ratio that are well suited to motor vehicles. In addition, they should enable a high starting-torque ratio in a forward direction and should include a direct gear for use in both passenger cars and commercial vehicles. In addition, these transmissions should also be easy to install, and should require, in particular, a small number of shifting elements, and they should avoid double shifting during sequential shifting, so that when shifting into defined shifting groups, only one shifting element is changed at any given time.

The present invention is based on the task of proposing a multi-speed transmission of the initially described art, with at least eight forward gears that can be shifted without range shifting and at least one reverse gear, which, with the use of at least four planetary gearsets, requires a minimum number of shifting elements. In addition, the transmission should have a high transmission-ratio spread with relatively harmonic gear shifting and, at least in the main driving gears, should demonstrate a favorable degree of efficiency, i.e., relatively low towing and toothing losses.

SUMMARY OF THE INVENTION

The inventive multi-speed transmission in planetary design is based on the gear scheme of the applicant's patent application of the generic type DE 10 2005 002 337.1 and discloses an input shaft, an output shaft, four coupled planetary gearsets, at least eight rotatable shafts, and five shifting elements (two brakes and three clutches), whose selective engagement produces different transmission ratios between the input shaft and the output shaft, so that eight forward gears and one reverse gear are obtained. In each gear respectively, three of the five shifting elements are engaged, whereas when shifting from one forward gear into the respective next following higher or lower forward gear, only one of the previously engaged shifting elements is disengaged, and only one of the previously disengaged shifting elements is engaged.

In terms of the invention, it is proposed that a ring gear of the fourth planetary gearset and the input shaft are permanently connected, and form the first shaft of the transmission;

a ring gear of the second planetary gearset and a carrier of the third planetary gearset and the output shaft are permanently connected to each other and form the second shaft of the transmission;

a sun gear of the first planetary gearset and a sun gear of the fourth planetary gearset are permanently connected and form the third shaft of the transmission;

a ring gear of the first planetary gearset forms the fourth shaft of the transmission;

a sun gear of the third planetary gearset forms the fifth shaft of the transmission;

a carrier of the first planetary gearset and a ring gear of the third planetary gearset are permanently connected and form the sixth shaft of the transmission;

a sun gear of the second planetary gearset and a carrier of the fourth planetary gearset are permanently connected and form the seventh shaft of the transmission;

a carrier of the second planetary gearset forms the eighth shaft of the transmission;

the first shifting element is arranged, in the direction of power flow, between the third shaft and a housing of the transmission;

the second shifting element is arranged, in the direction of power flow, between the fourth shaft and the transmission housing;

the third shifting element is arranged, in the direction of power flow, between the first and the fifth shaft of the transmission;

the fourth shifting element is arranged, in the direction of power flow, between the sixth and eighth shaft of the transmission, and the fifth shifting element is arranged, in the direction of power flow, between the fifth and the seventh shaft of the transmission.

The multi-speed transmission of this invention is therefore different from the generic multi-speed transmission according to DE 10 2005 002 337.1 in that henceforth, the ring gear of the fourth planetary gearset and the input shaft are permanently connected as the first shaft of the transmission; the second shaft of the transmission is also permanently connected with the ring gear of the second planetary gearset; the fifth shaft of the transmission is formed only by the sun gear of the third planetary gearset; and the sun gear of the second planetary gearset and the carrier of the fourth planetary gearset are permanently connected as the seventh shaft of the transmission.

As in the generic multi-speed transmission according to DE 10 2005 002 337.1, it is also the case for the inventive multi-speed transmission that the first forward gear results from the engagement of the first, second, and third shifting elements; the second forward gear from the engagement of the first, second, and fifth shifting elements; the third forward gear from the engagement of the second, third, and fifth shifting elements; the fourth forward gear from the engagement of the second, fourth, and fifth shifting elements; the fifth forward gear from the engagement of the second, third, and fourth shifting elements: the sixth forward gear from the engagement of the third, fourth, and fifth shifting elements; the seventh forward gear from the engagement of the first, third, and fourth shifting elements; the eighth forward gear from the engagement of the first, fourth, and fifth shifting elements; and the reverse gear from the engagement of the first, second, and fourth shifting elements.

Three of the four planetary gearsets are therefore designed as so-called negative planetary gearsets, whose respective planetary gears mesh with the sun gears and ring gears of the respective planetary gearset. One of the four planetary gearsets, specifically the fourth planetary gearset, is also designed as a so-called positive planetary gearset with inner and outer planetary gears that mesh with each other, whereby these inner planetary gears also mesh with the sun gear of this positive planetary gearset, and whereby these outer planetary gears also mesh with the ring gear of this plus planetary gearset. With respect to the spatial arrangement of the four planetary gearsets in the transmission housing, an advantageous configuration proposes that all four planetary gearsets are co-axially arranged, parallel to each other, in the sequential order of "first, fourth, second, third planetary gearset".

The spatial arrangement within the transmission housing of the shifting elements of the inventive multi-speed transmission is limited, in principle, only by the measurements and the external form of the transmission housing. Numerous improvements over the spatial arrangement and constructive design of the shifting elements can be seen, for example, over the patent application of the same genre, DE 10 2005 002 337.1.

For example, an option for an arrangement of shifting elements suitable for a standard drive proposes that in spatial terms: the first and second shifting elements are arranged, at least in part, in an area located radially above the first or fourth planetary gearset; and the third, fourth, and fifth shifting elements, in spatial terms, are arranged in an area axially between the fourth and second planetary gearset. In this case, for example, the third shifting element is directly axially adjacent on the fourth planetary gearset, while the fourth shifting element, in particular its disk pack, is directly axially adjacent on the second planetary gearset, whereby the fifth shifting element, in spatial terms, is arranged at least partially in an area axially between the third shifting element and the disk pack of the fourth shifting element. The disk pack of the fifth shifting element can, for example, but also in spatial terms, be arranged at least in part radially above the disk pack of the third shifting element. In a favorable constructive embodiment, a common disk carrier is provided for the third and fifth shifting element, which, corresponding to the gear scheme, is connected with the sun gear of the third planetary gearset. In spatial terms, the first and second shifting elements can be arranged, at least in part, axially parallel to each other or, at least in part, radially one above the other.

The inventive development of the multi-speed transmission, particularly for passenger cars, produces suitable ratios with a large transmission-ratio spread in harmonic gear shifting. In addition, with the inventive multi-speed transmission, construction expense is relatively small due to the small number of shifting elements, i.e., two brakes and three clutches. In addition, in the inventive multi-speed transmission, there is a good degree of efficiency in all gears, on the one hand due to low towing loss, because in each gear there are only two shifting elements that are disengaged at any given time, and on the other hand due to lower toothing loss in the simply constructed individual planetary gearsets.

In addition, it is advantageously possible, with the inventive multi-speed transmission, to start with a hydrodynamic torque converter, an external starting clutch, or other suitable external starting elements. It is also possible to enable starting by way of a starting element integrated into the transmission. One of the two brakes that are actuated in the first and second forward gears and in the reverse gear is preferably suited for this purpose.

Furthermore, the multi-speed transmission according to the invention is conceived to enable adaptability to different power-train configurations both in the direction of the power flow and with respect to spatial considerations. For example, it is therefore possible, without special constructive measures, to selectively arrange the input and output drives of the transmission co-axially or axially parallel to each other.

In the case of an application with input and output shafts that run co-axially to each other it is practical, for example, for the first planetary gearset to be the planetary gearset of the planetary gearset group that faces the power train. Depending on the arrangement of the five shifting elements inside the transmission housing, it can advantageously be provided that no more than one shaft of the transmission passes in an axial direction through the center of all four planetary gearsets. Then, in the context of a shifting element plan in which the planetary gearsets are: arranged co-axially to each other in the order of "first, fourth, second, third planetary gearset;" the first and second shifting elements are arranged radially on the input side above the first or fourth planetary gearset; and the third, fourth, and fifth shifting elements are arranged, at least in part, in an area axially between the fourth and second planetary gearsets; only the first shaft of the transmission passes centrally, in an axial direction, through the first and fourth planetary gearsets; while only the fifth shaft of the transmission passes centrally in an axial direction through the second planetary gearset; and no transmission shaft has to pass centrally in an axial direction through the third planetary gearset. The constructive design for the supply of pressurizing media and lubricants to the servomechanisms of individual shifting elements is correspondingly simple.

For an application where the input and output shafts run axially parallel or at an angle to each other, the first or third planetary gearset can be arranged on the side of the transmission housing that faces the drive motor that is functionally connected with the input shaft. If the first planetary gearset faces the transmission drive, there can—as with a co-axial arrangement of input and output shaft—depending on the spatial arrangement of the five shifting elements inside the transmission housing—be provision for no more than one shaft of the transmission to pass centrally in an axial direction through all four planetary gearsets, the first drive shaft passing centrally only through the first and fourth planetary gearsets; the fifth drive shaft passing only through the second planetary gearset.

If, on the other hand, the third planetary gearset faces the transmission drive, in the context of input and output shafts that are not co-axially arranged, no transmission shaft has to pass centrally in an axial direction through the first and fourth planetary gearsets. In the context of the axial arrangement, cited above, of the third, fourth, and fifth shifting elements between the second and fourth planetary gearset, for example, both the fifth drive shaft and the first drive shaft, which runs in part inside this fifth shaft, will pass centrally in an axial direction through the secondary planetary gearset, while the first shaft will pass centrally, in an axial direction, only through the third planetary gearset.

In any case, the third shaft of the transmission, which is formed in sections by the sun gears of the first and fourth planetary gearset, can be rotatably disposed on a hub attached to the transmission housing. If the first planetary gearset faces the transmission drive, then the hub, which is fixed to the transmission housing, is an integral part of the drive-side wall of the transmission housing, otherwise, it is an integral part of the transmission housing wall that is opposite the drive motor.

BRIEF DESCRIPTION OF THE DRAWINGS

The invention will now be described, by way of example, with reference to the accompanying drawings. The same, or as the case may be, comparable components are provided with the same reference symbols. The following are shown.

DETAILED DESCRIPTION OF THE INVENTION

Figure 1:
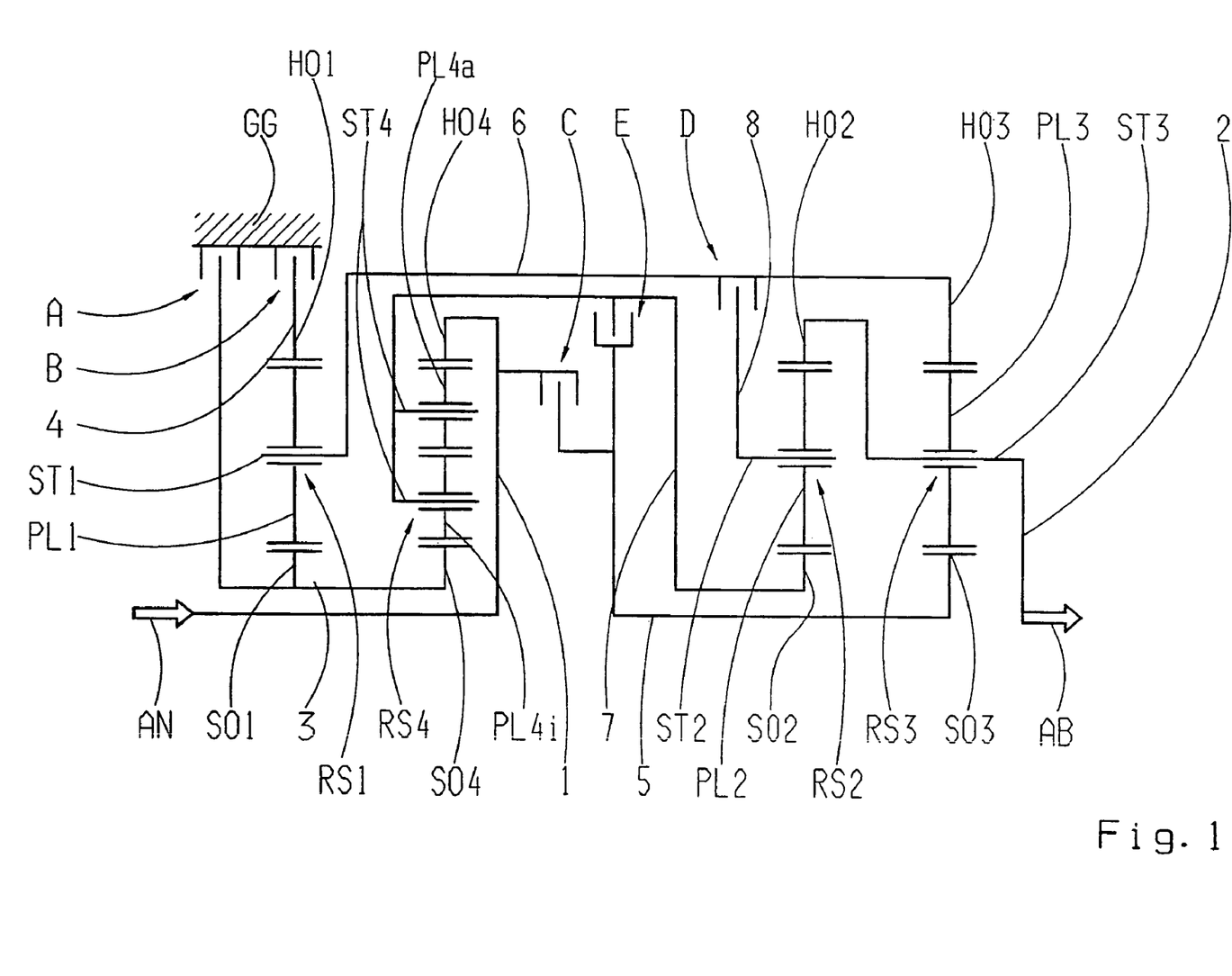
FIG. 1 is a diagrammatic view of an embodiment of the inventive multi-speed transmission.

FIG. 1 shows a version of an embodiment of the inventive multi-speed transmission. The transmission comprises an input shaft AN and an output shaft AB, as well as four planetary gearsets RS1, RS2, RS3, RS4, and five shifting elements A, B, C, D, E, which are all arranged in a housing GG of the transmission. In this embodiment, the four planetary gearsets RS1, RS2, RS3, RS4 are arranged co-axially in series in an axial direction in the order "RS1, RS4, RS2, RS3". The planetary gearsets RS1, RS2, and RS3 are configured as simple negative planetary gearsets. As is generally known, a negative planetary gearset has planetary gears that mesh with sun and ring gears of this planetary set. The ring gears of the planetary gearsets RS1, RS2, RS3 are designated by HO1, HO2, and HO3; the sun gears by SO1, SO2, and SO3; the planetary gears by PL1, PL2, and PL3; and the carriers, on which the planetary gears are rotatably disposed, with ST1, ST2, and ST3. The planetary gearset RS4 is configured as a simple positive planetary gearset in double planetary construction. As is generally known, a positive planetary gearset has inner and outer planetary gears that mesh with each other, whereby these inner planetary gears also mesh with the sun gear of this planetary set, and whereby these outer planetary gears also mesh with the ring gear of this planetary set. The ring gear of the planetary gearset RS4 is designated by HO4, the sun gear with SO4, the inner planetary gears with PL4$i$, the outer planetary gears with PL4$a$, the carrier on which the inner and outer planetary gears PL4$i$, PL4$a$ are rotatably fixed with ST4. The shifting elements A and B are configured as brakes, which in the version shown are both configured as friction-engaging, shiftable disc brakes, and can, of course, in a different embodiment, also be configured as friction-engaging, shiftable peripheral band brakes, or, for example, as form-engaging, shiftable claw or cone brakes. The shifting elements C, D, and E are configured as clutches, which in the version shown are all configured as friction-engaging, shiftable disk clutches, but which could, of course, in another embodiment, also be configured as form-locking, shiftable claw or cone clutches. With these five shifting elements A to E, selective shifting of eight forward gears and at least one reverse gear can be implemented. The multi-speed transmission according to the invention has a total of at least eight rotatable shafts, which are designated as 1 to 8.

With regard to the kinematic coupling of the individual elements of the four planetary gearsets RS1, RS2, RS3, RS4 to each other and to the input and output shafts AN, AB, the following is provided: The ring gear HO4 of the fourth planetary gearset RS4 and the input shaft AN are foxed together as the shaft 1. The ring gear HO2 of the second planetary gearset RS2, the carrier ST3 of the third planetary gearset RS3 and the output shaft AB are fixed together as the shaft 2. The sun gears SO1, SO4 of the first and fourth planetary gearsets RS1, RS4 are fixed together as the shaft 3. The ring gear HO1 of the first planetary gearset RS1 forms the shaft 4. The sun gear SO3 of the third planetary gearset RS3 forms the shaft 5. The carrier ST1 of the first planetary gearset RS1 and the ring gear HO3 of the third planetary gearset RS3 are fixed together as the shaft 6. The sun gear SO2 of the second planetary gearset RS2 and the coupled carrier ST4 of the fourth planetary gearset RS4 are fixed together as the shaft 7. The carrier ST2 of the second planetary gearset RS2 forms the shaft 8.

With regard to the kinematic coupling of the five shifting elements A to E with the so-described shafts 1 to 8 of the transmission, the following is provided for in the multi-speed transmission according to FIG. 1: the brake A as the first shifting element is arranged in the direction of power flow between the shaft 3 and a housing GG of the transmission. The brake B as the second shifting element is arranged in the direction of power flow between the shaft 4 and the housing GG. The clutch C as the third shifting element is arranged in the direction of power flow between the shaft 1 and the shaft 5. The clutch D as the fourth shifting element is arranged in the direction of power flow between the shaft 6 and the shaft 8. The clutch E as the fifth shifting element is arranged in the direction of power flow between the shaft 5 and the shaft 7.

Figure 3:
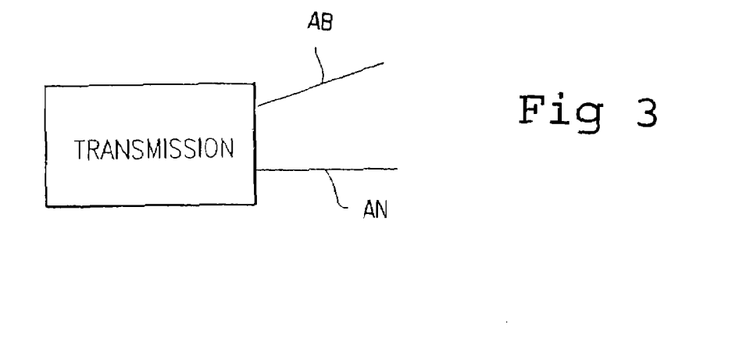
FIG. 3 is a schematic view of the multi-speed transmission with an input at an angle to an output shaft.
Figure 4:
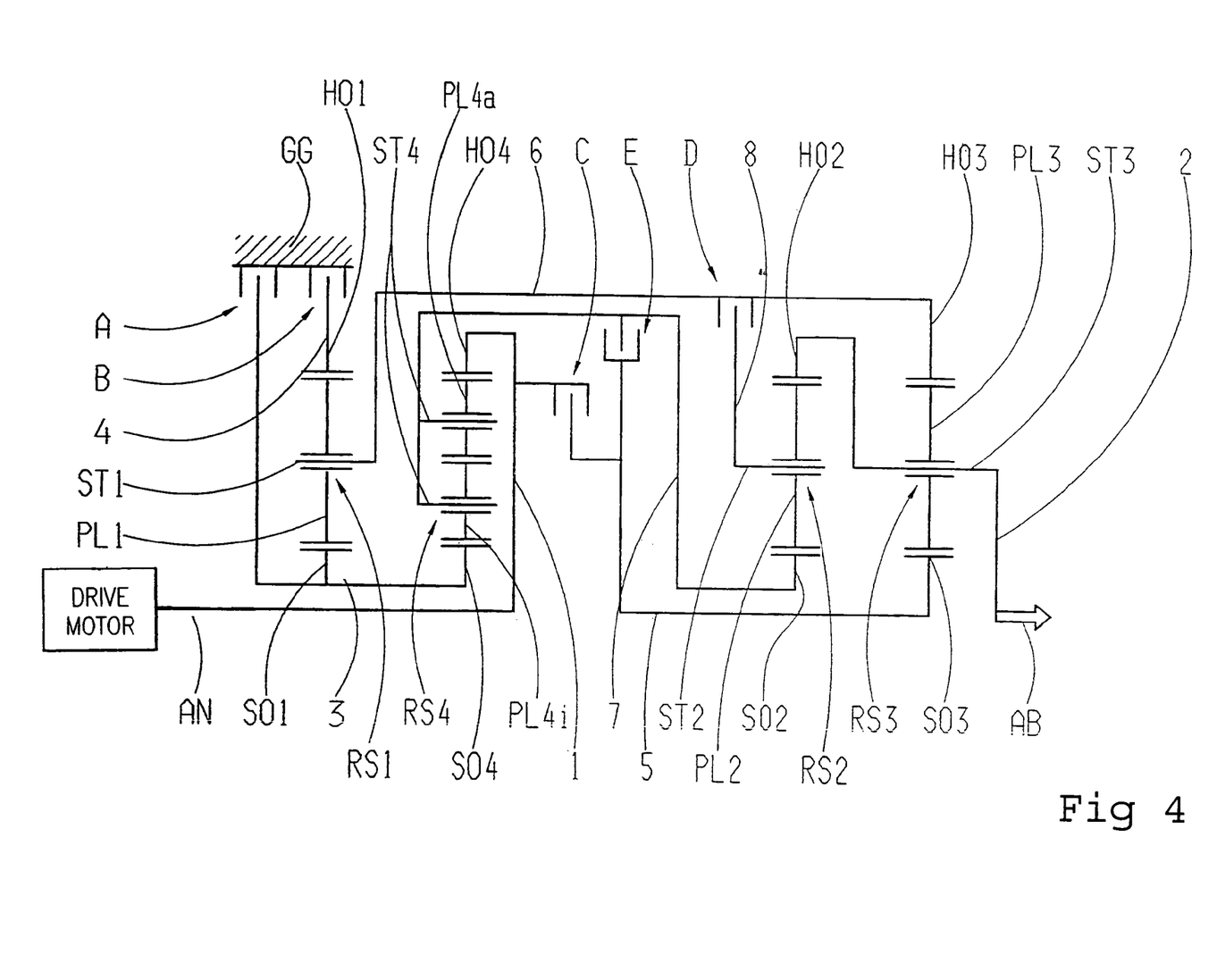
FIG. 4 is a schematic view of the multi-speed transmission with a first planetary gearset located on a side of the transmission facing a drive motor and functionally communicating with the drive shaft.
Figure 6:
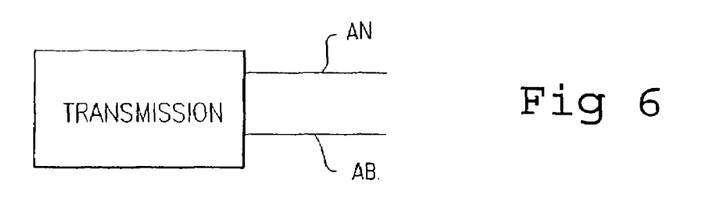
FIG. 6 is a schematic view of the multi-speed transmission with an input shaft and an output shaft located on a common side of the transmission housing.

In the version of the invention shown in FIG. 1, the first planetary gearset RS1 is the input-side gearset facing a drive engine of the transmission, and has a functional connection to the drive shaft AN, as shown in FIG. 4 and the third planetary gearset RS3 is the output-side gearset of the transmission, whereby the input shaft—AN and the output shaft AB, for example, are arranged co-axially to each other. It is easily apparent to the person skilled in the art that this transmission can be modified without major effort, so that input and output shafts are no longer co-axially arranged, but are rather, for example, axially side-by-side, as shown in FIG. 6 or at an angle to each other, as shown in FIG. 3. With this type of arrangement, the person skilled in the art will, as required, also arrange the transmission drive near the third planetary gearset RS3, i.e., on the side of the third planetary gearset RS3 that faces away from the first planetary gearset RS1.

In principle, the spatial arrangement of the shifting elements inside the transmission of the multi-speed transmission according to the invention as depicted shown in FIG. 1 is user-defined and will be limited only by the measurements and external form of the transmission housing GG.

In the embodiment shown in FIG. 1, the two brakes A, B, are arranged in spatial terms in the area of the first planetary gearset RS1, thereby axially parallel side-by-side to each other, on the input side, whereby the kinematic connection of the two brakes A, B to the first planetary gearset RS1 presupposes that the brake B is arranged closer to the fourth planetary gearset RS4, which is adjacent to the first planetary gearset RS1, than it is to brake A, or as the case may be, that the brake A is arranged closer to the drive of the transmission than the brake B. In spatial terms, the brake B is arranged at least in part in an area radially above the first planetary gearset RS1, and the brake A, correspondingly, is on the side of the first planetary gearset RS1 that faces away (input side) from the fourth planetary gearset RS4. An inner disk carrier of the brake A forms a section of the shaft 3 of the transmission and is connected in a rotationally fixed manner to the sun gear SO1 of the first planetary gearset RS1 on the side of the gearset that faces away from the fourth planetary gearset RS4. In sections, the shaft 3 is formed as a kind of sun shaft, which connects the sun gears SO1, SO4 of the planetary gearsets RS1, RS4 to each other. In this case, the shaft 3 can be adjustably disposed on both the input shaft AN and a hub (not shown in detail in FIG. 1) that is fixed to the transmission housing. An inner disk carrier of the brake B, as the shaft 4 of the transmission, is connected in a rotationally fixed manner with the ring gear HO1 of the first planetary gearset RS1. In the interest of simplification, the servomechanisms required to actuate the friction elements of both brakes A, B are not depicted in detail in FIG. 1 and could, for example, be integrated into the transmission housing GG or a housing cover that is fixed to the housing, or as the case may be, disposed in an axially slideable manner.

The person skilled in the art will modify this spatial arrangement of the two brakes A, B as required, without any particular inventive effort. The brake A can, for example, be arranged at least in part radially above the first planetary gearset RS1, and the brake B at least in part radially above the fourth planetary gearset RS4. In yet another embodiment, the two brakes A, B could, for example, also be arranged radially, one above the other, axially adjacent to the first planetary gearset RS1, on the side of this gearset that faces away from the fourth planetary gearset RS4, whereby the brake B is then, for example, arranged on a larger diameter than the brake A.

As can also be seen from FIG. 1, all three clutches C, D, E, are at least partially, in spatial terms, axially arranged in an area between the fourth and second planetary gearsets RS4, RS2, whereby, in the interest of simplification, the servomechanism required to activate the respective disk packs of the clutches C, D, E is not shown in detail in FIG. 1.

Axially, the clutch C abuts directly on the fourth planetary gearset RS4. An outer disk carrier of the clutch C thereby forms a section of the shaft 1 of the transmission, and is connected in a rotationally fixed manner with the ring gear HO4 of the fourth planetary gearset RS4 and the input shaft AN on the side of the disk pack of the clutch C that faces the fourth planetary gearset RS4. An inner disk carrier of the clutch C forms a section of the shaft 5 of the transmission and is connected in a rotationally fixed manner with the sun gear SO3 of the third planetary gearset RS3. The servomechanism that is required to actuate the disk pack of the clutch C can, for example, be arranged inside the cylinder chamber that is formed by the outer disk pack of the clutch C, can be axially displaceably disposed on this outer disk pack carrier of the clutch C, and then rotates permanently with the revolution of the shaft 1 or, as the case may be, the input shaft. In order to compensate for the rotatory pressure of the rotating pressure chamber of this servomechanism, the clutch C can, as is known from the prior art, be provided with dynamic pressure compensation.

As can also be seen from FIG. 1, in spatial terms at least the disk pack of the clutch D is arranged adjacent to the second planetary gearset RS2. In this, an inner disk carrier of the clutch D forms a section of the shaft 8 of the transmission and is connected in a rotationally fixed manner with the carrier ST2 of the second planetary gearset, on the side of the second planetary gearset RS2 that faces the fourth planetary gearset RS4. An outer disk carrier of the clutch D forms a section of the shaft 6 of the transmission and is connected in a rotationally fixed manner with both the carrier ST1 of the first planetary gearset RS1 and the ring gear HO3 of the third planetary gearset RS3. In its axial course, the shaft 6 therefore completely overlaps the fourth planetary gearset RS4, the clutches C, E and the second planetary gearset RS2. The servo mechanism necessary for actuating the disk pack of the clutch D can, for example, be arranged inside the cylinder chamber that is formed by the outer disk carrier of the clutch D or by the shaft 6, can be disposed in an axially slideable manner on this outer disk carrier of the clutch D or on the shaft 6, and then continuously rotates at the speed of this shaft 6. In addition, the pressure chamber of the servomechanism of the clutch D can be arranged, for example, near the disk pack for the clutch D and near the second planetary gearset RS2, but also, for example, in an area axially between the first and fourth planetary gearsets RS1, RS4. In order to compensate for the rotatory pressure of its rotating pressure chamber, the servomechanism of the clutch D, as is known from the prior art, can be provided with dynamic pressure compensation.

As can also be seen from FIG. 1, the disk pack of the clutch E is arranged in spatial terms in an area axially between the disk pack of the clutch C and the disk pack of the clutch D. An outer disk carrier of the clutch E, which forms a section of the shaft 7 of the transmission, is connected in a rotationally fixed matter with both the coupled carrier ST4 of the fourth planetary gearset RS4 and the sun gear SO2 of the second planetary gearset RS2. An inner disk carrier of the clutch E forms a section of the shaft 5 of the transmission and is—like the inner disk carrier of the clutch C—connected in a rotationally fixed manner with the sun gear SO3 of the third planetary gearset RS3. In terms of assembly, a common disk carrier can advantageously be provided for the clutches C, E. The servomechanism necessary for actuation of the disk pack of the clutch E can, for example, be disposed in an axially displaceable manner on the inner disk carrier of the clutch E and then rotates permanently with the revolution of the shaft 5. The servomechanism of the clutch E can, however, also be axially displaceably disposed on the outer disk carrier of the clutch E, and in this case rotates permanently with the revolution of the shaft 7. Like the clutches C and D, the clutch E can be provided with dynamic pressure compensation.

It is expressly pointed out that the arrangement of the three clutches C, D, E described above is only to be seen as an example. If required, the person skilled in the art will also modify this example of the spatial arrangement of the three clutches C, D, E. Numerous suggestions for this can, for example, be found in the generically similar patent application DE 10 2005 002 337.1. For example, without essentially changing the component structure of the transmission depicted in FIG. 1, it can be provided that the disk pack of the clutch E, in spatial terms, is arranged at least in part radially above the disk pack of the clutch C, that therefore the clutch E, in spatial terms, is at least in part arranged radially above the clutch C.

Figure 2:
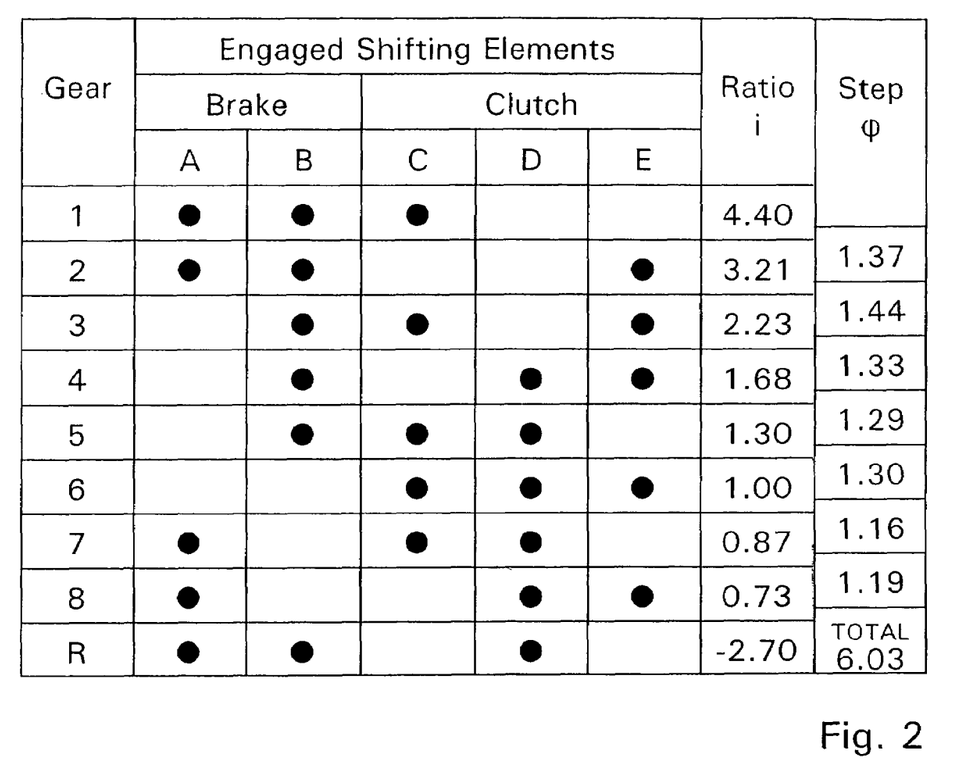
FIG. 2 is an example of a shift pattern for the multi-speed transmission according to FIG. 1.

FIG. 2 shows a shift pattern for the inventive multi-speed transmission according to FIG. 1. In each gear, three shifting elements are locked and two shifting elements are open. In addition to the gearshift logic, the shift pattern also shows examples of values of gear transmission ratios "i" for the individual gear ratios and the progressive ratios $\phi$ determined on that basis. The specified transmission ratios "i" are obtained from the (typical) standard gear ratios of the four planetary sets RS1, RS2, RS3, RS4 of minus 2.50, minus 3.70, minus 3.40, and plus 3.70. In addition, the shift pattern also shows that with a sequential shifting method, double or combination connections can be avoided, because in the gearshift logic, two adjacent gear ratios use two shifting elements in common. The sixth gear is configured as a direct gear.

The first forward gear is obtained by locking the brakes A and B and the clutch C; the second forward gear by locking the brakes A and B and the clutch E; the third forward clear by engaging the brake B and the clutches C and E; the fourth forward gear by engaging the brake B and the clutches D and E; the fifth forward gear by engaging the brake B and the clutches C and D; the sixth forward gear by engaging the clutches C, D and E; the seventh forward gear by engaging the brake A and the clutches C and D, and the eighth forward gear by engaging the brake A and the clutches D and E. As the shift pattern further shows, the reverse gear is obtained by engaging the brakes A and B and the clutch D.

In terms of the invention, it is possible to start the motor vehicle with a shifting element that is integrated into the transmission. A shifting element is particularly suitable if it is required in both forward and reverse gears, in this case, therefore, preferably the brake A or the brake B. Advantageously, both of these brakes A, B are also required in the second forward gear. If the brake B is used as a starting element that is integrated into the transmission, starting is even possible in the first five forward gears and the reverse gear. As the shifting pattern shows, the clutch C can also be used for starting in a forward direction of motion, and for starting in a reverse direction, the clutch D can be used as the internal transmission starting element.

The following also applies to the examples of implementation of a multi-speed transmission that are shown or described above.

In terms of the invention, different gear transitions can also be produced with the same shifting pattern, depending on the manual transmission ratio of the individual planetary gears, so that it is possible to have variations specific to vehicle use or type.

Figure 5:
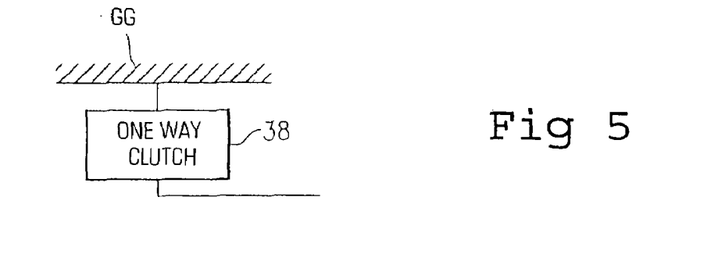
FIG. 5 is a schematic view of the multi-speed transmission with a one way clutch is located between a shaft and a housing of the transmission.

It is also possible. as shown in FIG. 5. to provide additional one-way clutches 38 at any suitable position in the multi-speed transmission, for example, between a shaft and the housing GG or if necessary, in order to connect two shafts.

Figure 7:
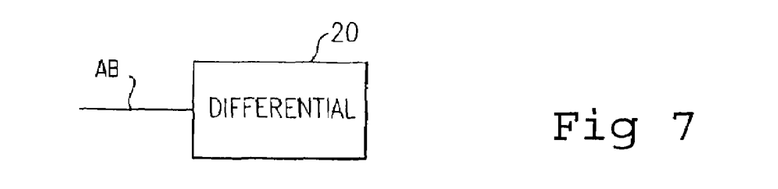
FIG. 7 is a schematic view of the multi-speed transmission with a differential located an output shaft.

An axial and/or distributor differential 20 can be arranged on the input side or on the output side, as shown in FIG. 7.

Figure 8:
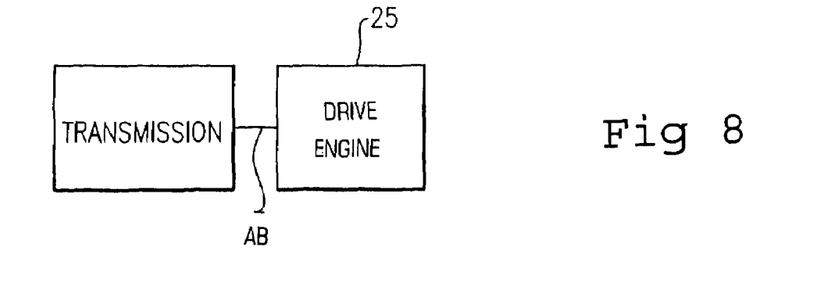
FIG. 8 is a schematic view of the multi-speed transmission with an additional drive engine located on a shaft.
Figure 9:
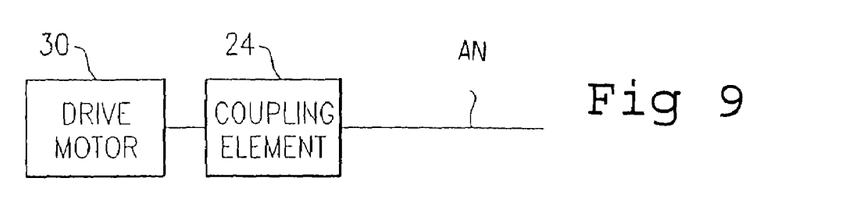
FIG. 9 is a schematic view of the multi-speed transmission with a coupling element located between a drive motor and an input shaft.
Figure 10:
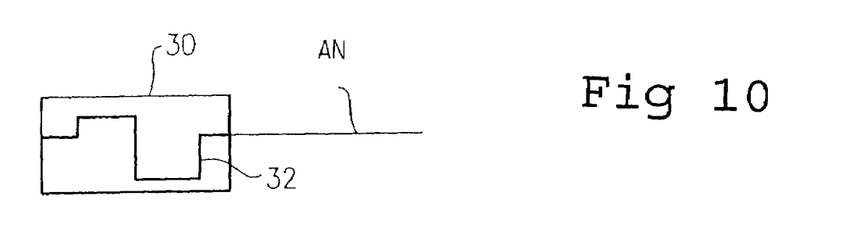
FIG. 10 is a schematic view of the multi-speed transmission with an input shaft rotationally fixed to a crankshaft of a drive motor.

In an advantageous further development of the invention, as shown in FIG 9 the input shaft AN can be separated, if needed, by way of a coupling element 24 from a drive motor 30 whereby a hydrodynamic converter, a hydraulic clutch, a dry starting clutch, a wet starting clutch, a magnetic powder clutch, or a centrifugal clutch can be employed as this kind of starting element. It is also possible to arrange a driving element 25 as shown in FIG. 8 of this kind behind the transmission in the direction of power flow, whereby in this case as shown in FIG. 10, the input shaft AN is permanently connected to the crankshaft 32 of the drive motor 30.

The inventive multi-speed transmission also enables the situation of a torsional vibration damper between the engine and the transmission.

Figure 11:
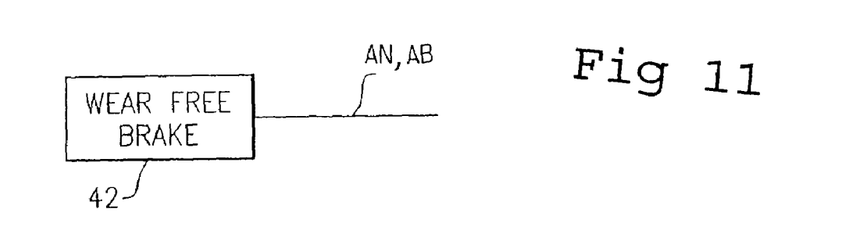
FIG. 11 is a schematic view of the multi-speed transmission with a wear free brake located on a shaft.
Figure 12:
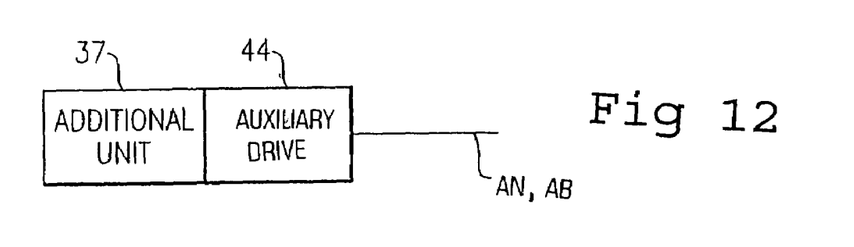
FIG. 12 is a schematic view of the multi-speed transmission with an auxiliary drive for actuating an additional unit is located on a shaft.

Within the scope of a further embodiment of the invention, as shown in FIG. 11, a wear-free brake 42 such as a hydraulic or electric retarder or similar device, can be arranged on any shaft, preferably on the input shaft AN or the output shaft AB, this being particularly important for use in commercial vehicles. In addition, as shown in FIG. 12. an auxiliary drive system 44 can also be provided to drive additional units 37 on any shaft, preferably on the input shaft AN or the output shaft AB.

The shifting elements used can be configured as power shiftable clutches or brakes. In particular, force-locking clutches or brakes, such as disk clutches, band brakes, and/or cone clutches can be used. In addition, form-locking brakes and/or clutches, such as synchronization and dog clutches, can also be sued as shifting elements.

Figure 13:
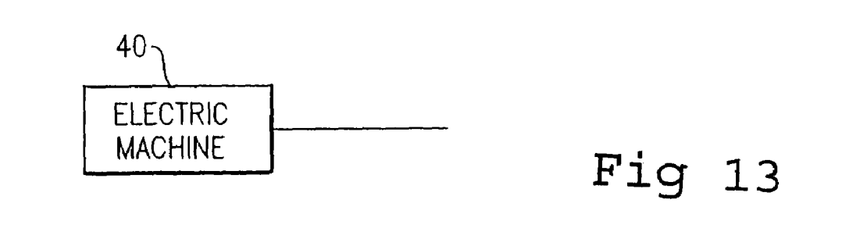
FIG. 13 is a schematic view of the multi-speed transmission with an electrical machine located on a shaft.

An additional advantage of the multi-speed transmission presented here is the possibility of affixing an electrical machine 40 as a generator and/or additional main engine on each shaft, as shown in FIG. 13.

It is self-evident that any construction designs that do not affect the functioning of the transmission as specified in these claims, in particular any spatial arrangement of the planetary sets or shifting elements as such, or in relation to each other, and as far as technically expedient, fall under the scope of protection of the present claims, even if these designs are not explicitly presented in the Figures or the description.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4a outer planetary gears of the fourth planetary gearset
PL4i inner planetary gears of the fourth planetary gearset
i ratio
φ ratio range

The invention claimed is:

1. A multi-speed automatic transmission of a planetary design for a motor vehicle, the transmission comprising:
an input shaft (AN);
an output shaft (AB);
first, second, third and fourth planetary gearset (RS1, R52, R53, R54);
at least first, second, third, fourth, fifth, sixth, seventh and eighth rotatable shafts (1,2,3,4,5,6,7,8); and
first, second, third, fourth and fifth shifting elements (A, B, C, D, E) whose selective engagement generates a plurality of reduction ratios between the input shaft (AN) and the output shaft (AB) such that eight forward gears and at least one reverse gear can be implemented;
a sun gear (SO1) of the first planetary gearset (RS1) and a sun gear (SO4) of the fourth planetary gearset (R54) are connected with one another and form the third shaft (3);
a ring gear (HO1) of the first planetary gearset (RS1) forms the fourth shaft (4);
a carrier (ST1) of the first planetary gearset (RS1) and a ring gear (HO3) of the third planetary gearset (RS3) are connected with one another and form the sixth shaft (6);
a carrier (ST2) of the second planetary gearset (RS2) forms the eighth shaft (8);
a ring gear (HO4) of the fourth planetary gearset (RS4) and the input shaft (AN) are connected with one another and form the first shaft (1);
a ring gear (HO2) of the second planetary gearset (RS2) and a carrier (ST3) of the third planetary gearset (RS3) and the output shaft (AB) are connected with one another and form the second shaft (2);
a sun gear (SO3) of the third planetary gearset (RS3) forms the fifth shaft (5);
a sun gear (SO2) of the second planetary gearset (RS2) and a carrier (ST4) of the fourth planetary gearset (RS4) are connected with one another and form the seventh shaft (7);
the first shifting element (A) is located between the third shaft (3) and a housing (GG) of the transmission;
the second shifting element (B) is arranged between the fourth shaft (4) and the housing (GG) of the transmission;
the third shifting element (C) is arranged, in a direction of power flow, between the first shaft (1) and the fifth shaft (5);
the fourth shifting element (D) is arranged, in a direction of power flow, between the sixth shaft (6) and the eighth shaft (8); and
the fifth shifting element (E) is arranged, in a direction of power flow, between the fifth shaft (5) and the seventh shaft (7).

2. The multi-speed transmission according to claim 1, wherein a first forward gear is implemented by engaging the first, the second, and the third shifting elements (A, B, C);
a second forward gear is implemented by engaging the first, the second, and the fifth shifting elements (A, B, E);
a third forward gear is implemented by engaging the second, the third, and the fifth shifting elements (B, C, E);
a fourth forward gear is implemented by engaging the second, the fourth, and the fifth shifting elements (B, D, E);
a fifth forward gear is implemented by engaging the second, the third, and the fourth shifting elements (B, C, D);
a sixth forward gear is implemented by engaging the third, the fourth, and the fifth shifting elements (C, D, E);
a seventh forward gear is implemented by engaging the first, the third, and the fourth shifting elements (A, C, D);
a eighth forward gear is implemented by engaging the first, the fourth, and the fifth shifting elements (A, D, E); and
a reverse gear is implemented by engaging the first, the second, and the fourth shifting elements (A, B, D).

3. The multi-speed transmission according to claim 1, wherein the first, the second, and the third planetary gearsets (RS1, RS2, RS3) are negative planetary gearsets, and the fourth planetary gearset (RS4) is a positive planetary gearset.

4. The multi-speed transmission according to claim 1, wherein the first, the second, the third and the fourth planetary gearsets (RS1, RS2, RS3, RS4) are co-axially arranged in an axial direction in a sequential order as follows, the first planetary gearset (RS1), the fourth planetary gearset (RS4), the second planetary gearset (RS2) and the third planetary gearset (RS3).

5. The multi-speed transmission according to claim 1, wherein the input shaft (AN) is one of axially parallel and at an angle to the output shaft (AB), one of the first planetary gearset (RS1) and the third planetary gearset (RS3) is located on a side of the transmission facing a drive motor and functionally communicates with the drive shaft (AN).

6. The multi-speed transmission according to claim 1, wherein the input shaft (AN) is coaxial with the output shaft (AB), the first planetary gearset (RS1) is located on a side of the transmission facing a drive motor and functionally communicates with the drive shaft (AN).

7. The multi-speed transmission according to claim 1, wherein only the input shaft of the transmission extends centrally, in an axial direction, through the third shaft (3) which supports the sun gears (SO1, SO4) of the first and the fourth planetary gearsets (RS1, RS4), and only the fifth shaft (5) extends centrally, in an axial direction, through a portion of the seventh shaft (7) adjacent the sun gear (SO2) of the second planetary gearset (RS2).

8. The multi-speed transmission according to claim 1, wherein only the first shaft (1) extend centrally, in an axial direction, through the first and the fourth planetary gearsets (RS1, RS4), and only the fifth shaft (5) passes centrally, in the axial direction, through the second planetary gearset (RS2).

9. The multi-speed transmission according to claim 1, wherein only the fifth shaft (5) extends centrally, in the axial direction, completely through the second planetary gearset (RS2) and supports the sun gear (SO3) of the third planetary gearset (RS3).

10. The multi-speed transmission according to claim 1, wherein the third shaft (3) is releasably located on a hub fixedly connectable to the transmission housing (GG).

11. The multi-speed transmission according to claim 1, wherein at least a section of at least one of the first shifting element (A) and the second shifting element (B) is located in an area radially above one of the first planetary gearset (RS1) and the fourth planetary gearset (RS4).

12. The multi-speed transmission according to claim 1, wherein the first shifting element (A) is radially located beside the second shifting element (B), at least one friction element of the second shifting element (B) is located closer to the fourth planetary gearset (RS4) than a friction element of the first shifting element (A).

13. The multi-speed transmission according to claim 1, wherein the first shifting element (A) is radially offset from the second shifting element (B).

14. The multi-speed transmission according to claim 1, wherein the third shifting element (C) is located at least partially in an area axially between the fourth and the second planetary gearsets (RS4, RS2).

15. The multi-speed transmission according to claim 1, wherein the third shifting element (C) is axially directly adjacent the fourth planetary gearset (RS4).

16. The multi-speed transmission according to claim 1, wherein the fourth shifting element (D) is located at least partially in an area axially between the fourth and the second planetary gearsets (RS4, RS2).

17. The multi-speed transmission according to claim 1, wherein a disk pack of the fourth shifting element (D) is located adjacent to the second planetary gearset (RS2).

18. The multi-speed transmission according to claim 1, wherein the fifth shifting element (E) is axially located at least partially in an area between the fourth and the second planetary gearset (RS4, RS2).

19. The multi-speed transmission according to claim 1, wherein the fifth shifting element (E) is axially located at least partially in an area between the third and the fourth shifting elements (C, D).

20. The multi-speed transmission according to claim 1, wherein a disk pack of the fifth shifting element (E) is radially located at least partially above a disk pack of the third shifting element (C).

21. The multi-speed transmission according to claim 1, wherein the third and fifth shifting elements (C, E) have a common disk carrier which is coupled to the sun gear (SO3) of the third planetary gearset (RS4).

22. The multi-speed transmission according to claim 1, wherein the sixth shaft (6) axially surrounds the fourth planetary gearset (RS4), the third shifting element (C), the fifth shifting element (E), and the second planetary gearset (RS2).

23. The multi-speed transmission according to claim 1, wherein a free wheel is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the housing (GG) of the transmission.

24. The multi-speed transmission according to claim 1, wherein the input shaft (AN) and the output shaft (AB) are located on opposites sides of the transmission housing (GG).

25. The multi-speed transmission according to claim 1, wherein the input shaft (AN) and the output shaft (AB) are located on a common side of the transmission housing (GG).

26. The multi-speed transmission according to claim 1, wherein at least one of an axial differential and a distributor differential is located on one of the input shaft (AN) and the output shaft (AB).

27. The multi-speed transmission according to claim 1, wherein a coupling element is located, in a direction of power flow, between a drive motor and the input shaft (AN).

28. The multi-speed transmission according claim 27, wherein the coupling element is one of a hydrodynamic converter, a hydraulic clutch, a dry start clutch, a wet start clutch, a magnetic powder clutch, and a centrifugal clutch.

29. The multi-speed transmission according to claim 1, wherein the motor vehicle is started by one of the first, the second, the third and the fourth shifting elements (A, B, C, D), and the input shaft (AN) is rotationally fixed to a crankshaft of a drive motor.

30. The multi-speed transmission according claim 29, wherein one of the first shifting element (A) and the second shifting element (A, B) starts the vehicle in one of a forward and a reverse direction.

31. The multi-speed transmission according to claim 1, wherein at least one of a wear free brake, an auxiliary drive for actuation of an additional unit, an electrical machine and an additional drive engine is located on at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8).

32. The multi-speed transmission according to claim 1, wherein the first, the second, the third, the fourth and the fifth shifting elements (A, B, C, D, E) are one of a friction-engaging clutch, a friction-engaging brake, a disk clutch, a peripheral band brake, a cone clutch, a form-engaging shifting element, a form-engaging brake, a cone clutch and a dog clutch.

* * * * *